(12) United States Patent
Hedberg et al.

(10) Patent No.: US 9,834,244 B2
(45) Date of Patent: Dec. 5, 2017

(54) TRAILER WITH BOGIE AND RUNNERS FOR OFF-ROAD DRIVING

(71) Applicant: Brenderup AB, Jönköping (SE)

(72) Inventors: Fredrik Hedberg, Västervik (SE); Eric Grönlund, Västervik (SE)

(73) Assignee: BRENDERUP AB, Jönköping (SE)

( * ) Notice: Subject to any disclaimer, the term of this patent is extended or adjusted under 35 U.S.C. 154(b) by 0 days.

(21) Appl. No.: 15/287,317

(22) Filed: Oct. 6, 2016

(65) Prior Publication Data

US 2017/0297602 A1    Oct. 19, 2017

(30) Foreign Application Priority Data

Oct. 8, 2015 (EP) ..................................... 15188907

(51) Int. Cl.
  *B62B 13/18* (2006.01)
  *B62B 17/04* (2006.01)
  *B62D 63/06* (2006.01)

(52) U.S. Cl.
  CPC .............. *B62B 13/18* (2013.01); *B62B 17/04* (2013.01); *B62D 63/06* (2013.01)

(58) Field of Classification Search
  CPC ......... B62B 13/18; B62B 17/02; B62B 17/04; B62D 63/06
  USPC ................................................. 280/9, 10, 11
  See application file for complete search history.

(56) References Cited

U.S. PATENT DOCUMENTS

| | | | | |
|---|---|---|---|---|
| 2,521,330 | A * | 9/1950 | Berra | B62B 9/00 280/11 |
| 4,354,390 | A * | 10/1982 | Chamberlain | B62D 21/183 172/388 |
| 8,727,360 | B2 * | 5/2014 | Catford | B60G 5/00 280/43.18 |
| 2011/0181006 | A1 * | 7/2011 | Heppner | B60G 11/04 280/9 |

\* cited by examiner

*Primary Examiner* — John Walters
(74) *Attorney, Agent, or Firm* — Kagan Binder, PLLC (57) ABSTRACT

A trailer for being pulled by a motor vehicle, the trailer comprising a chassis having a front section, a first side section and a second side section, wherein the front section comprises coupling means for being coupled to a motor vehicle. The trailer further comprises a first and a second bogie, each bogie having two wheels, the first bogie being connected to the first side section of the chassis in a first pivoting coupling and the second bogie being connected to the second side section of the chassis in a second pivoting coupling. The trailer comprises a first and a second runner extending in the driving direction of the trailer and the first and second runners are moveable between an on-road position and an off-road position, and the first runner is mechanically coupled to the first bogie and the second runner is mechanically coupled the second bogie so that the runners may pivot relative the chassis.

19 Claims, 6 Drawing Sheets

TRAILER WITH BOGIE AND RUNNERS FOR OFF-ROAD DRIVING

This application claims benefit from European Application No. 15188907.8, which was filed on Oct. 8, 2015, the entirety of said patent application is incorporated herein by reference.

TECHNICAL FIELD

The present invention relates to a trailer for a motor vehicle. More specifically, the invention relates to a trailer for a motor vehicle wherein the trailer comprise a bogie suspended pair of wheels and runners for being drivable in an off-road environment.

BACKGROUND OF THE INVENTION

Trailers are commonly used to increase loading capacity for a vehicle. Some vehicles are adapted to be driven both on roads and off roads, and consequently there is a need for trailers that can be driven both on and off roads. One way of increasing the off road capabilities of a trailer is to use a bogie suspension for the wheels of the trailer, since this constructions allows the wheels to pivot relative the chassis of the trailer. Moreover, in some environments such as when driving in snow, passing deep ditches or driving in a very uneven terrain, runners may be used to increase the off-road capabilities of a trailer.

However, runners are not preferred on a trailer when driving it on a road.

Therefore, there is a need for an improved trailer with good driving capabilities both on road and off-road.

SUMMARY OF THE INVENTION

In view of the above-mentioned and other drawbacks of the prior art, the object of the present inventive concept is to provide a trailer with improved on-road and off-road capabilities by being adaptable to the environment.

The invention is based on the inventors' insight that the trailer's function is improved by providing a trailer where the runners are mechanically coupled to the bogies, i.e. pivotable runners, and further making the runners movable between an off-road an on-road position.

According to a first aspect of the invention there is provided a trailer for being pulled by a motor vehicle, the trailer comprising a chassis having a front section, a first side section and a second side section, wherein the front section comprises coupling means for being coupled to a motor vehicle. The trailer further comprises a first and a second bogie, each bogie having two wheels, the first bogie being connected to the first side section of the chassis in a first pivoting coupling and the second bogie being connected to the second side section of the chassis in a second pivoting coupling. Finally the trailer comprises a first and a second runner extending in the driving direction of the trailer. The first and second runners are moveable between an on-road position and an off-road position, and the first runner is mechanically coupled to the first bogie and the second runner is mechanically coupled the second bogie so that the runners may pivot relative the chassis.

In the context of this application driving direction should be understood as either forward or backwards in the orientation that the wheels are aligned, i.e. along the extension of the extension of the side sections of the chassis.

Hereby, a trailer is provided with improved on-road and off-road capabilities since the trailer comprise runners that are adjustable to either on-road or off-road conditions. Further, since the runners are mounted on the bogie they are pivotable relative the chassis of the trailer which provides vastly improved off-road capabilities.

In one embodiment the first and second runners are closer to the chassis in the on-road position than in the off-road position. Hereby, the runners may be moved so that an increased clearance is achieved when the trailer is run on a road. Thereby wind resistance may be decreased and also the risk of the runners colliding with an object lying on the road may be decreased.

In one embodiment each wheel are individually suspended by springing means. In yet one embodiment the springing means suspending each wheel are torsion springing means. By individually suspending the wheels with springing means both on-road but primarily off-road capabilities are improved further.

In yet one embodiment the first and second runners are further suspended directly to the chassis by means of a first and second front suspension means, respectively.

Thereby, despite being pivotable relative the chassis by means of the pivotable coupling the runners' pivoting movement is restricted by means of the suspension connected to the chassis. Thereby, the risk of a runner getting stuck on an off-road obstacle with the front end of the runner is alleviated, especially when driving in a forward direction. In the context of this application, a forward direction is to be interpreted as a moving direction when the front section is arranged forwardly.

In yet one embodiment the first and second runners are further suspended directly to the chassis by means of a first and second rear suspension means, respectively.

Thereby, analogous to the explanation above, despite being pivotable relative the chassis by means of the pivotable coupling the runners' pivoting movement is restricted by means of the suspension connected to the chassis. Thereby, the risk of a runner getting stuck on an off-road obstacle with the rear end of the runner is also alleviated, especially when driving in a backwards direction. In the context of this application, a backwards direction is to be interpreted as a moving direction when the rear section is arranged forwardly.

In one embodiment the first and second front suspension means and the first and second rear suspension means, can only receive forces along its extension in a direction from the chassis, when in use.

Hereby, the bogie may still pivot to some extent since no side forces, nor any forces in a vertically upwards direction, may be received by the suspension means. Hereby, the risk of a runner getting stuck on an off-road obstacle with the front or rear end of the runner is alleviated since the runners may pivot but not tilted down towards the ground.

In yet one embodiment the first and second front suspension means and the first and second rear suspension means are wires.

In the context of this application wires should be interpreted as any flexible suspension means, such as a wire, cable, chain, rope, line, that may only take up forces in a pulling action, i.e. along its extension.

The first and second front suspension means and the first and second rear suspension means may each be a single wire. In one embodiment each suspension means are formed from a wire loop. Thereby, the wires only need to withstand half of the load as compared to when a single wire is used for each suspension means.

Thereby, analogous to the explanation above, despite being pivotable the bogies pivoting movement in a downwards direction is limited. The bogies pivoting movement relative the chassis is limited by the suspension means since they are connected to the chassis and to the runners, and the runners in turn are connected to the respective bogie.

In yet one embodiment the first and second front suspension means and the first and second rear suspension means are sized and adapted to be substantially passive when the first and second runner is in the on-road position.

In this context substantially passive is to be interpreted as that the suspension means does not exert/receive, substantially any forces on/from the runners.

Thereby, when the runners are in an on-road position the bogie may be fully pivotable without being restricted by the front or rear suspension means.

In one embodiment each of the first and second front suspension means and the first and second rear suspension means are sized and adapted to restrict the pivoting movement in a downwards direction relative a coupling point of the respective suspension means in the chassis when the first and second runner is in the off-road position.

Thereby, when the runners are in an off-road position the bogie is restricted from pivoting in a downwards direction during use. This is especially an advantage when driving in winter conditions with snow, since it alleviates problems with the runners getting stuck in deep snow. Hereby, the off-road capabilities are vastly improved.

In yet one embodiment the first and second runner is movable between the on-road and off-road position by means of a threaded rod and meshing threaded sleeve.

By providing a threaded rod and meshing threaded sleeve the runners may be moved between the on-road and off-road position by means of a crank handle. This allows a used to change positions of the runners without manually pulling/pushing the runners into the desired position. Further, a threaded rod and meshing threaded sleeve may be constructed to be strong so as to be able to force the runners into the desired position in an easy and quick way.

In other embodiments, there may be an alternative solution to the threaded rod and meshing threaded sleeve with the same functionality, i.e. a mechanical connection allowing a powerful movement of the runner(s). Such embodiments may e.g. be a wire and pulley or a hydraulic arrangement with a moving cylinder. The function of the set of threaded rod and meshing threaded sleeve could be generalized as a mechanical construction allowing the runners to move from one position to the other position.

In yet one embodiment each of the first and second runners is individually movable between the on-road and off-road position by means of a first set and second set of threaded rod and meshing threaded sleeve, respectively. Hereby, the runners may be moved individually. Further a simple construction may be used, so as to allow as much road clearance (clearance under the trailer) as possible. The clearance under the trailer is improves the off-road capabilities. Any construction coupling the two sets of threaded rod and meshing threaded sleeve would also restrict the boogies to move (pivot) individually.

In one embodiment each of the first and second set of threaded rod and meshing threaded sleeve is mechanically connected to the first respectively the second runner at a first end and mechanically connected to the first respectively the second bogie at a second end.

Hereby, the bogies pivoting movement is not affected by the threaded rod and meshing threaded sleeve, since the whole arrangement pivots together.

In yet one embodiment each of the set of threaded rod and meshing threaded sleeve is sized and adapted to lift the trailer on the first and second runner relative the ground if needed when moved from the on-road position to the off-road position.

Hereby, the runners may be moved into the off-road position regardless if there is enough free space under the runners or not. If there is not enough free space the runners will simply lift the trailer so that the free space is created by moving the trailer upwards.

In the context above, the term that the set of threaded rod and meshing threaded sleeve is sized and adapted to lift the trailer means that the dimensions of the set is selected so that it may take enough load for lifting the trailer, and also is long enough to move the runner so that it may lift the trailer. However, it does not mean that the runners need to be moved below the wheels when in use. In fact, it is preferred that the wheels are arranged closer to the ground than the runners, since this provides the best off-road capabilities.

In yet one embodiment each of the first and second runner is secured in the on-road position and/or the off-road position by means of a securing bolt.

Hereby, any vibrations or other affecting movements that may occur during usage of the trailer will not cause the runners to move from the selected position, on-road or off-road position. Instead, the securing bolt will in a simple way prevent any undesired movements.

According to a second aspect of the invention there is provided a method for adjusting a runner on a trailer from a first on-road position to a second off-road position. The method comprising the steps (i) providing a trailer having a chassis with a first and a second pivotable bogie, each bogie having two wheels, the trailer further comprising a first and a second runner extending in the driving direction of the trailer and being moveable between an on-road position and an off-road position, and (ii) rotating a threaded rod relative a meshing threaded sleeve, wherein one of the threaded rod and the threaded sleeve is mechanically coupled to the first runner, and the other one of the threaded rod and the threaded sleeve is mechanically coupled to the first bogie, so that the first runner is moved relative the first bogie from an on-road position into an off-road position.

Hereby, a trailer may quickly and without any advanced procedures be adjusted to have improved on-road or off-road capabilities, depending on which position the runners are moved to. That is, as discussed above, when driving on-road the runners may be moved out of the way to increase the road clearance. Further, when using the trailer off-road, the runners may be moved downwards to improve the off-road capabilities by alleviating traveling over large holes, ditches, in snow or other obstacles.

In one embodiment the step of rotating the threaded rod comprise rotating the threaded rod relative the meshing threaded sleeve until the first runner reaches an end-position in a mechanical coupling between the runner and the first bogie.

In one embodiment, the runners are initially unsecured by releasing a securing bolt before rotating the threaded rod relative the meshing threaded sleeve. In yet one embodiment the securing bolt is placed in a bore in the mechanical coupling between the first runner and the first bogie so as to prevent movement from the end-position.

Hereby, as discussed above, any vibrations or other affecting movements that may occur during usage of the trailer will not cause the runners to move from the selected position, on-road or off-road position.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

In the following, the end of the trailer which is to be attached to a motor vehicle is called the front end, and the opposing end is called the rear end. Moreover, the side which is up during use of the trailer on a flat surface is called the "top" and the side downwards is referred to as being down of downwards. Thus, a top view is seen from the side where any load is to be placed on the trailer. These names should not be construed as limited to the inventive scope.

Further, the trailer in the figures does not have any cargo or cargo carrying system etc. It is to be understood as that the trailer may be used for any type of transportation, cargo or even people.

Further, the terms on-road position and off-road position does not necessarily mean that the trailer is only to be driven off-road in the off-road position and vice versa. E.g. the off-road position may be preferred when crossing demanding obstacles such as ditches or when riding in snow. Further the on-road position may very well be used in off-road conditions where the environment does not have any tough obstacles.

Moreover, some of the details of the bogies 20, 30 are only denoted and explained once in relation to the first bogie 20 and the first runner 25. However, if not explicitly stated otherwise it is to be understood that corresponding features and functions may be found on the second bogie 30 and second runner 35.

Figure 1:
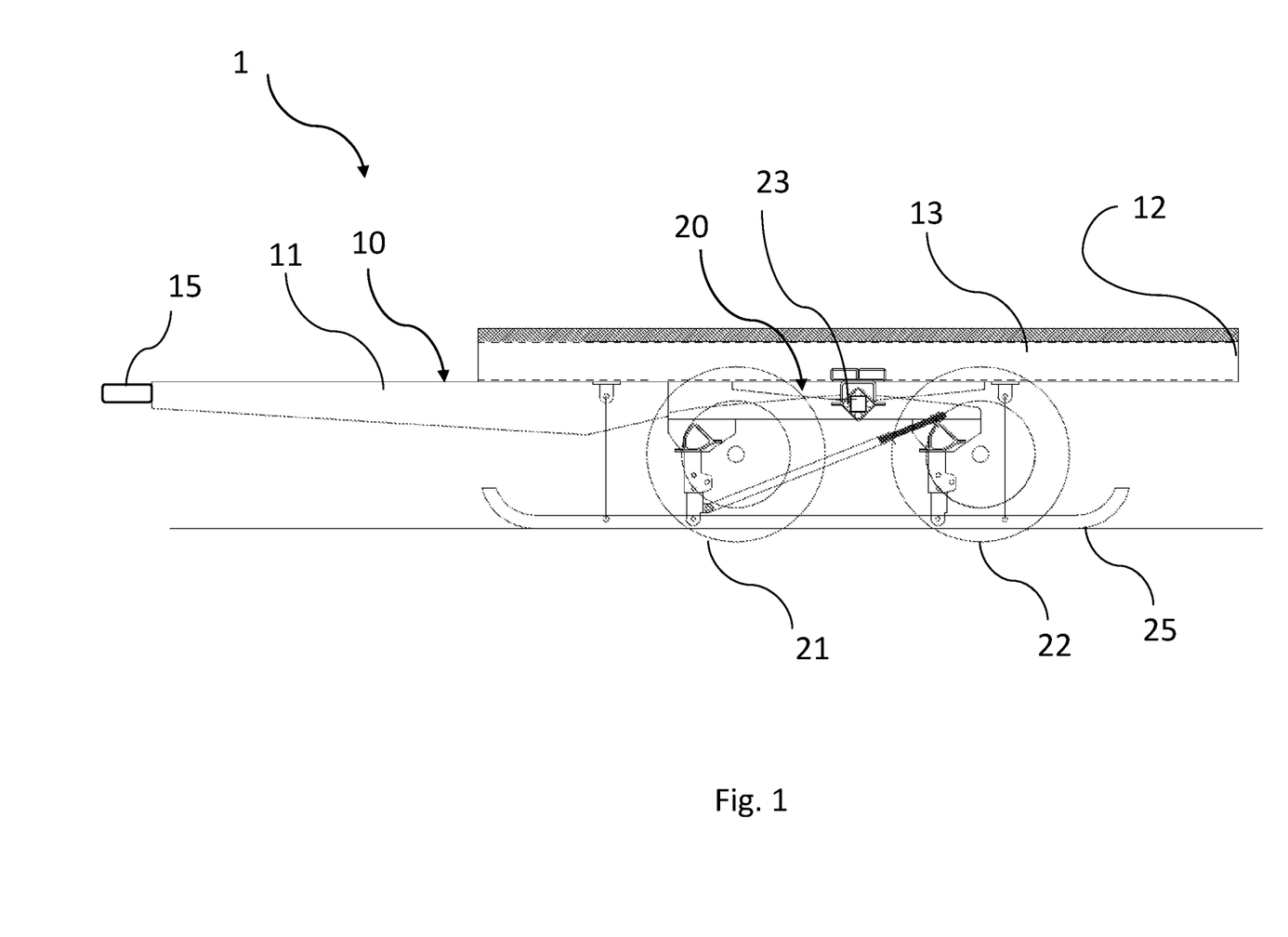
FIG. 1 is a side view of a trailer with bogies and runners.

FIG. 1 is a side view of a trailer 1 with a chassis 10 where the first bogie 20 with the two corresponding wheels 21, 22 is illustrated. Further, the first runner 25 is also illustrated.

The bogie 20 is connected to the chassis 10 by means of a pivoting coupling 23. Further the chassis has a front end 10 having a coupling means 15 for allowing the trailer to be coupled to a motor vehicle. Further, the chassis 10 comprise a first side section 13, a second side section 14 (not shown, see FIG. 5) and a rear section.

Figure 2:
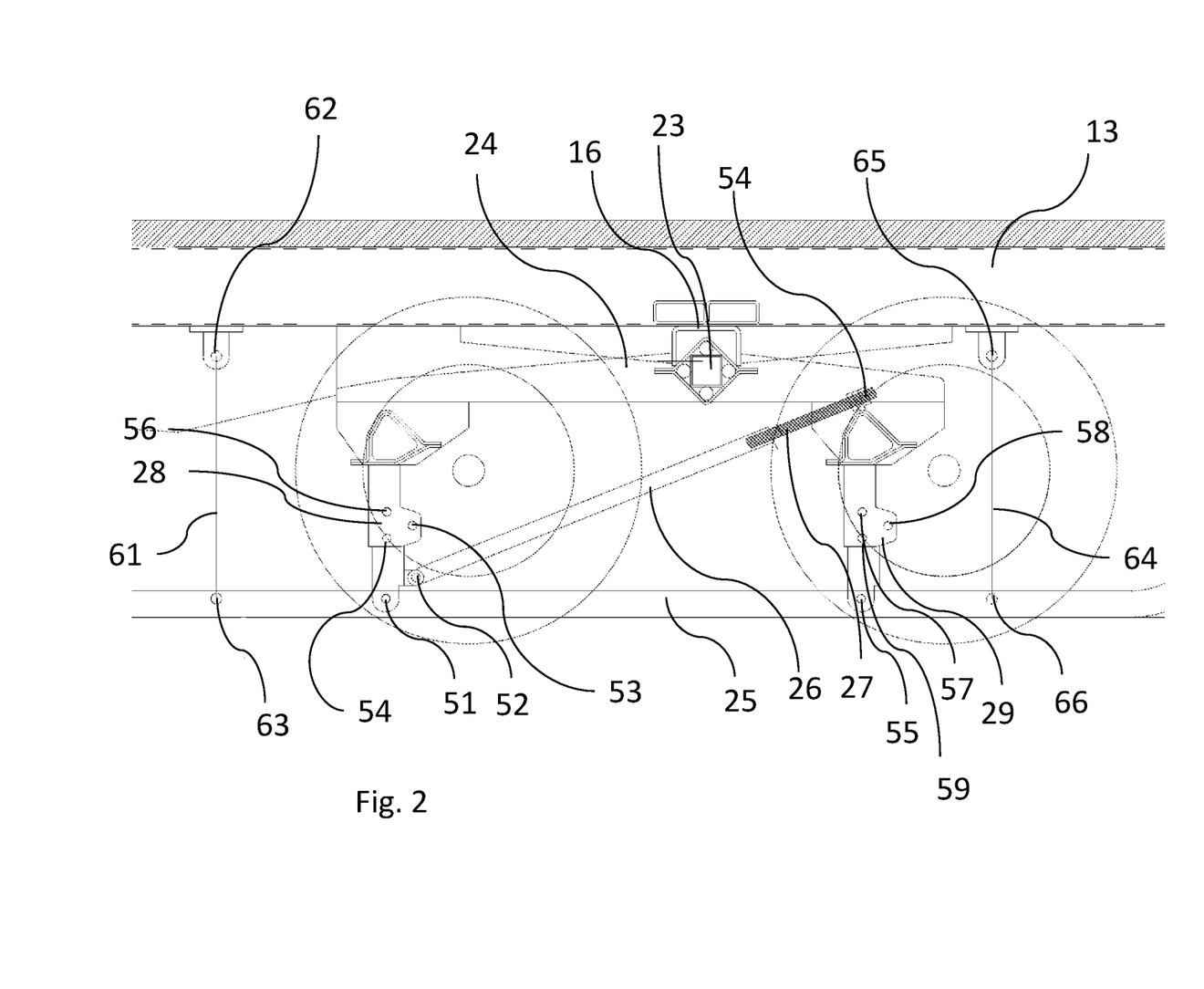
FIG. 2 is a close up side view of a trailer with bogies and runners in an off-road position.

FIG. 2 is shows the same trailer and view as FIG. 1, but in a close up side view. In the close-up some of the details of the boogie 20 are clearer. It is shown that the pivoting coupling 23 in which the bogie is mechanically coupled to the chassis 10 is coupled to an intermediate cross beam 16 which is attached to the chassis 10 and the pivoting coupling 23. Further the bogie comprise a wheel beam 24 for extending both forward and backward of said pivoting coupling 23 and to which the wheels are mechanically coupled. Out of clarity reasons the suspension of the wheels are not illustrated, but the wheels may be individually suspended with for example a torsion spring means.

Further, the wheel beam 24 comprise a front beam 28 extending downwards from the front end of the wheel beam and a rear beam 29 extending downwards from the rear end of the wheel beam 24. As shown in FIG. 2, the first runner 25 is mechanically connected to the front beam 28 and the rear beam 29 in two pivotable couplings 51, 55. The front beam 28 and rear beam 29 each comprise a pivoting function 56, 57. These pivoting functions allow the runner 25 to be pivotably movable from the off-road position (as shown in FIG. 2) to the on-road position (as shown in FIG. 3).

Further, the threaded rod 27 and the meshing threaded sleeve 26 are attached to the runner 25 in another pivotable coupling 52. Moreover, the threaded rod 27 and the meshing threaded sleeve 26 are mechanically connected to the bogie at a threaded coupling 54. Hereby, the when the threaded rod is turned the length of the threaded rod and the threaded sleeve together increase/decrease so as to move the runner between the on-road position and the off-road position. Moreover, the runner 25 may be secured in each position by means of security bolt (not shown) in a receiving hole 51, 52, 58, 59. It is also possible to use a single hole to secure the runner in any of the two positions. This allows a secure fastening of the runner that is not affected by for example vibrations.

Moreover, the first runner 25 is suspended by a front suspension means 61 and a rear suspension means 64. The front suspension means is coupled to the runner 25 in a first receiving point 63, and coupled to the chassis in a second receiving point 62. Moreover, rear suspension means 64 is coupled to the runner 25 in a third receiving point 66, and coupled to the chassis in a forth receiving point 65. In this embodiment the front and rear suspension means 61, 64 are steel wires. They may be other types of suspension means. However, an advantage with wires is that they may only receive pulling forces which only limits the bogies' 20, 30 pivoting movement in a downwards direction. In one embodiment (not shown) the wires are formed like a loop, so as to increase the load capacity of the wire. The bogies' 20, 30 pivoting movement relative the chassis 10 is limited by the suspension means 61, 64 since they are connected to the chassis 10 and to the runners 25, 35, and the runners in turn are connected to the respective bogie 20, 30.

Figure 3:
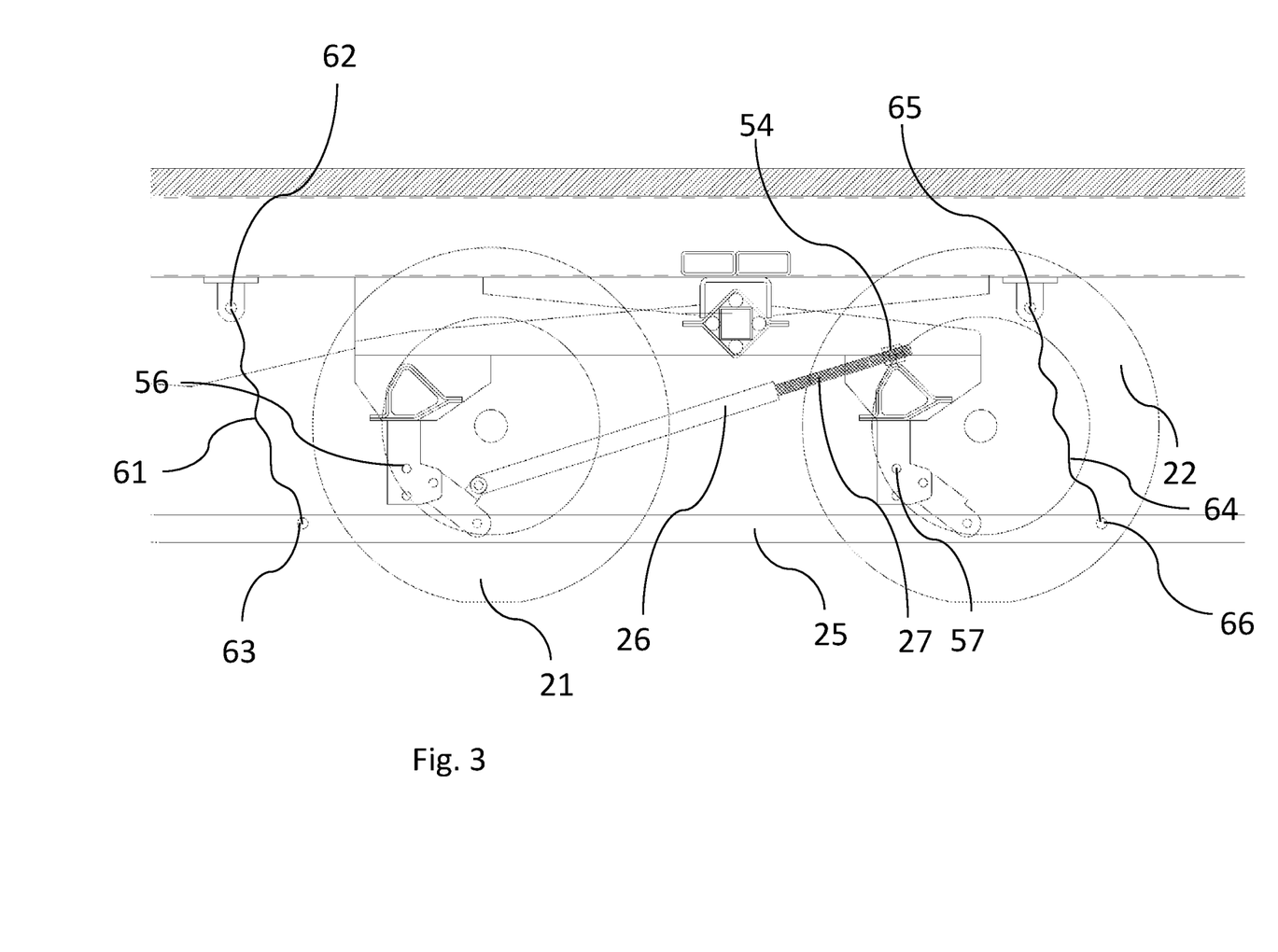
FIG. 3 is a close up side view of a trailer with bogies and runners in an on-road position.

FIG. 3 shows the same view as FIG. 2 but with the difference that the runners are in the on-road position in FIG. 3. This is shown through that the front beam 28 and rear beam 29 each are pivoted at the pivoting functions 56, 57, so that the runner is pulled higher up towards the chassis 10 of the trailer 1. The reason to that the runners are in this position is that the threaded rod 27 has been rotated relative the threaded sleeve 26 so that its length has been decreased and the runner 25 has been lifted towards the chassis 10. Moreover, it is shown in FIG. 3 that the front suspension means 61 and the rear suspension means 64 are passive in this position since they are not tensioned but slacking. From FIG. 3 it is clear that the trailer 1 has an increased road clearance between the ground and the runners in the on-road position of the first runner 25. At least, it is clear that the vertical distance between the lower end of the wheels 21, 22 and the lower end of the first runner 25 is increased relative the corresponding distance in the off-road position.

Figure 4:
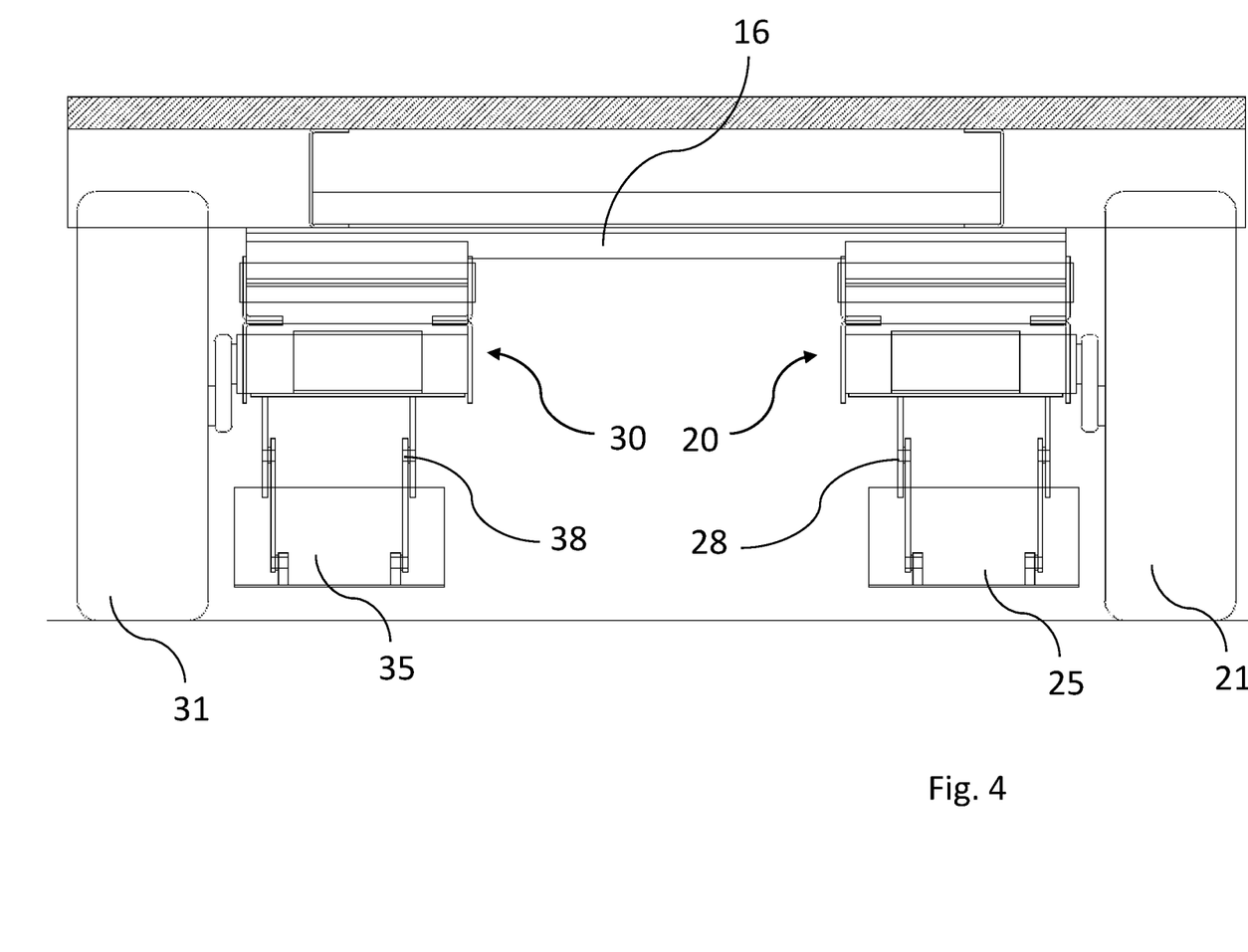
FIG. 4 is a cross-sectional front view of a trailer with bogies and runners.

FIG. 4 is a cross-sectional front view of the trailer 1 when the runners 25, 35 are in the off-road position i.e. closer to the ground than in the on-road position. Moreover, the figure schematically illustrates how the bogies 20, 30 are connected to the respective wheel 21, 31 and to the runners 25, 35 via the front beams 28. The suspension means 61, 64 are not illustrated in the figure since FIG. 4 is a cross-section, taken from the front plane and placed between the suspension means and the front wheels 21, 31. Moreover, in FIG. 4 the cross beam 16 to which the bogies 20, 30 are attached to the chassis 10 is clearly illustrated. In the illustrated embodiment, the crossbeam 16 is shared by both bogies.

Figure 5:
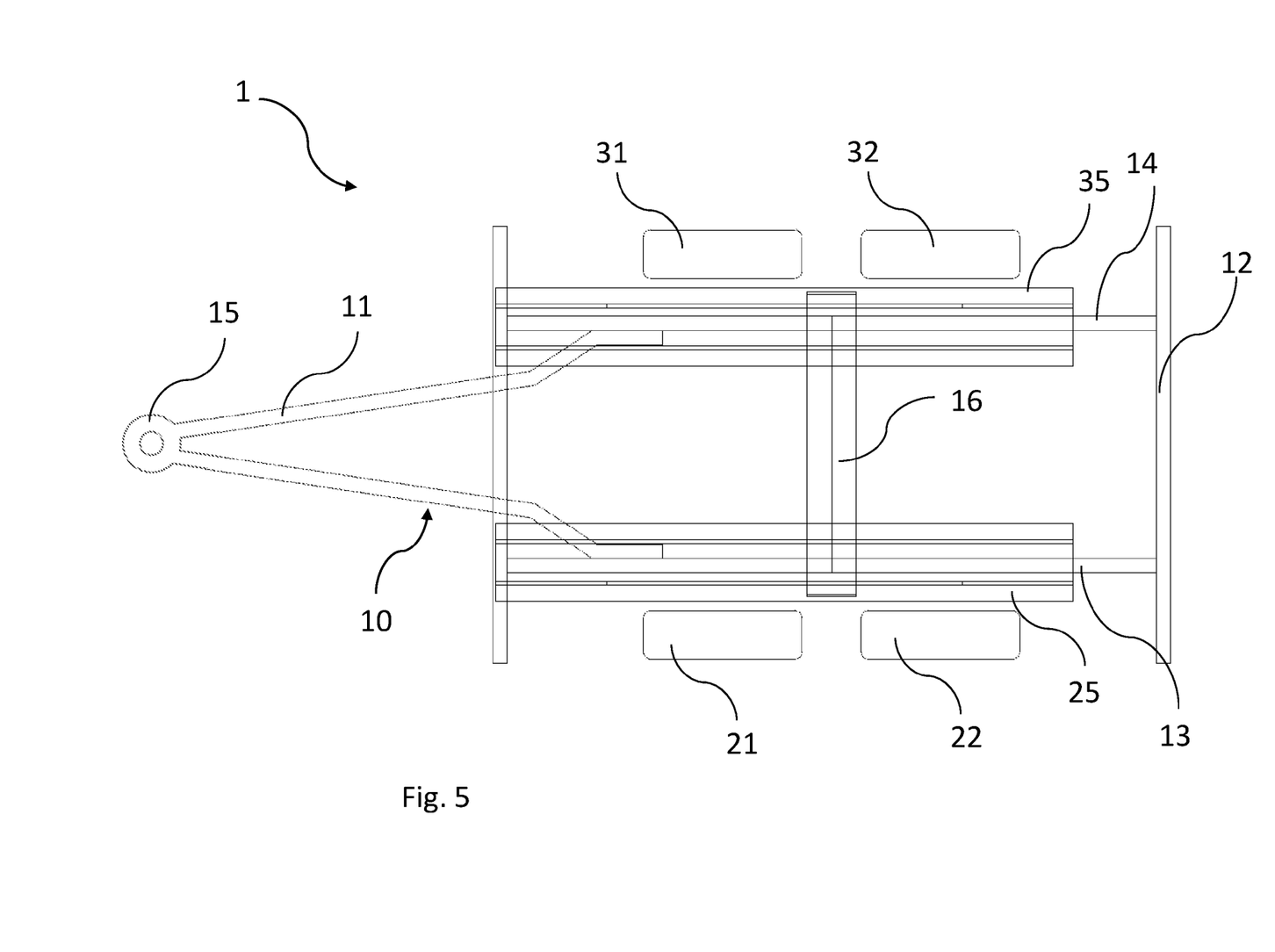
FIG. 5 is a top view of a trailer with bogies and runners.

Further, FIG. 5 is a top view of the trailer according to one embodiment where the chassis 10 is clearly illustrated with its front section 11 and rear section 12. The front section 11 comprises a coupling means 15 for coupling the trailer 1 to a motor vehicle. The rear end 12 may comprise e.g. license plate and/or rear lighting etc. Moreover, the chassis 10 comprise a first side section 13 to which the first bogie 20 with the first 21 and second 22 wheel are attached. Further, the chassis 10 comprise a second side section 14 to which the second bogie 30 with the corresponding first 31 and second 32 wheel are attached to it. Moreover, the crossbeam 16 is illustrated how it extends from the first side section 13 to the second side section 14 of the chassis 10.

Figure 6:
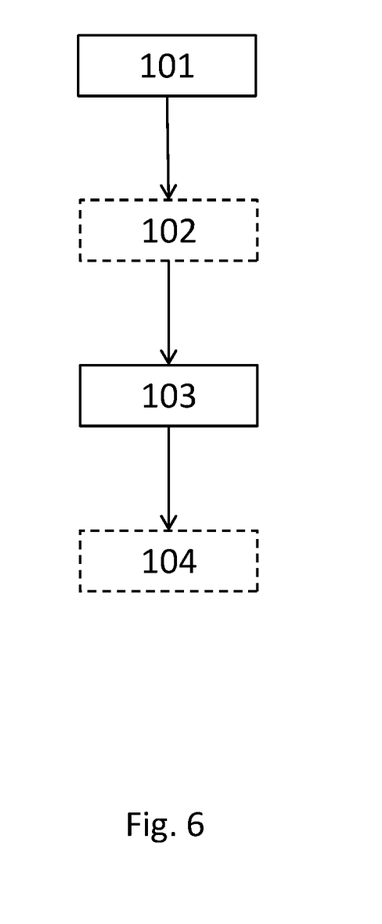
FIG. 6 is schematic overview of the method for adjusting a runner on a trailer from a first on-road position to a second off-road position.

Finally, FIG. 6 is a schematic overview of the method for adjusting a runner on a trailer from a first on-road position to a second off-road position. The first step is to provide 101 a trailer 1 as has been discussed above. Thereafter, optionally one may remove 102 the securing bolt from the front beam 28 and the rear beam 29. Thereafter the step of rotating 103 the threaded rod 27 relative a meshing threaded sleeve 26 is to be carried out. Then, since one of the threaded rod 27 and the threaded sleeve 26 is mechanically coupled to the first runner 25, and the other one of the threaded rod 27 and the threaded sleeve 26 is mechanically coupled to the first bogie 20 the first runner is moved relative said first bogie from an on-road position into an off-road position. Finally, one may optionally replace 104 the securing bolt to the front beam 28 and the rear beam 29, so as to lock the front and rear beam into the desired position.

The invention claimed is:

1. A trailer (1) for being pulled by a motor vehicle, said trailer comprising
    a chassis (10) having a front section (11), a first side section (13) and a second side section (14), wherein the front section (11) comprises coupling means (15) for being coupled to a motor vehicle,
    a first (20) and a second (30) bogie, each bogie having two wheels (21, 22, 31, 32), said first bogie (20) being connected to the first side section (13) of said chassis (10) in a first pivoting coupling (23) and said second bogie (30) being connected to the second side section (14) of said chassis (10) in a second pivoting coupling,
    a first (25) and a second (35) runner extending in a driving direction of the trailer,
    wherein
    said first (25) and said (35) second runner are moveable between an on-road position and an off-road position, and
    said first runner (25) is mechanically coupled to said first bogie (20) and said second runner (35) is mechanically coupled said second bogie (30) so that said runners (25, 35) may pivot relative said chassis (10).

2. The trailer (1) according to claim 1, wherein said first (25) and second (35) runners are closer to the chassis (10) in said on-road position than in said off-road position.

3. The trailer (1) according to claim 1, wherein said first (25) and second (35) runners are further suspended to said chassis (10) by means of a first (61) and second front suspension means, respectively.

4. The trailer (1) according to claim 1, wherein said first (25) and second (35) runners are further suspended to said chassis (10) by means of a first (64) and second rear suspension means, respectively.

5. The trailer (1) according to claim 1, wherein said first (25) and second (35) runner is movable between said on-road and off-road position by means of a threaded rod (27) and meshing threaded sleeve (26).

6. The trailer (1) according to claim 1, wherein each of said first (25) and second (35) runner is individually movable between said on-road and off-road position by means of a first set and second set of threaded rod (27) and meshing threaded sleeve (26), respectively.

7. The trailer (1) according to claim 6, wherein each of said first and second set of threaded rod (27) and meshing threaded sleeve (26) is mechanically connected to the first (25) respectively the second (35) runner at a first end (52) and mechanically connected to the first (25) respectively the second (35) bogie at a second end (54).

8. The trailer (1) according to claim 6, wherein each of said set of threaded rod (27) and meshing threaded sleeve (26) is sized and adapted to lift the trailer (1) on said first (25) and second (35) runner relative the ground if needed when moved from said on-road position to said off-road position.

9. The trailer (1) according to claim 1, wherein each of said first (25) and second (35) runner is secured in the on-road position and/or said off-road position by means of a securing bolt (53, 54).

10. The trailer (1) according to claim 1, wherein said first (25) and second (35) runners are further suspended to said chassis (10) by means of a first (61) and second front suspension means, respectively, and wherein said first (25) and second (35) runners are further suspended to said chassis (10) by means of a first (64) and second rear suspension means, respectively.

11. The trailer (1) according to claim 10, wherein each first (61) and second front suspension means and/or each first (64) and second rear suspension means, can only receive forces along an extension of said respective front or rear suspension means in a direction from the chassis (10) to the respective runner (25, 35), when in use.

12. The trailer (1) according to claim 10, wherein said first (61) and second front suspension means and/or said first (64) and second rear suspension means are wires.

13. The trailer (1) according to claim 10, wherein each of said first (61) and second front suspension means and/or said first (64) and second rear suspension means are sized and adapted to be substantially passive when the first (25) and second (35) runner is in said on-road position.

14. The trailer (1) according to claim 10, wherein each of said first (61) and second front suspension means and/or said first (64) and second rear suspension means are sized and adapted to restrict the pivoting movement in a downwards direction relative a coupling point (62, 65) of the respective suspension means (61, 64) in the chassis (10) when the first (25) and second (35) runner is in said off-road position.

15. The trailer (1) according to claim 1, wherein said first (25) and second (35) runners are further suspended to said chassis (10) by means of a first (61) and second front suspension, respectively, and wherein said first (25) and second (35) runners are further suspended to said chassis (10) by means of a first (64) and second rear suspension, respectively.

16. The trailer (1) according to claim 15, wherein the suspension of the first (61) and of the second front suspension and the first (64) and second rear suspension are each selected from the group consisting of wire, cable, chain, rope, and line.

17. The trailer (1) according to claim 15, wherein the suspension of the first (61) and of the second front suspension and the first (64) and second rear suspension are each formed from a wire loop.

18. A method for adjusting a runner on a trailer (1) from a first on-road position to a second off-road position, comprising the steps of;
Providing (101) a trailer (1) having a chassis (10) with a first and a second pivotable bogie, each bogie having two wheels, the trailer further comprising a first and a second runner extending in the driving direction of the trailer (1) and being moveable between an on-road position and an off-road position, and
rotating (103) a threaded rod (27) relative a meshing threaded sleeve (26), wherein one of the threaded rod (27) and the threaded sleeve (26) is mechanically coupled to the first runner, and the other one of the threaded rod (27) and the threaded sleeve (26) is mechanically coupled to the first bogie, so that said first runner is moved relative said first bogie from an on-road position into an off-road position.

19. The method according to claim 18, wherein the step of rotating said threaded rod (27) comprise rotating said threaded rod relative the meshing threaded sleeve (26) until the first runner reaches an end-position in a mechanical coupling between said runner and said first bogie.

\* \* \* \* \*